US006239053B1

(12) United States Patent
Petschauer et al.

(10) Patent No.: US 6,239,053 B1
(45) Date of Patent: May 29, 2001

(54) LARGE FORMAT FIRECLAY REFRACTORY BLOCK AND METHOD OF PRODUCING THE SAME

(75) Inventors: Hans Petschauer, Grossalmerode; Franz Gebhardt, Würselen, both of (DE)

(73) Assignee: VGT Industriekeramik GmbH, Grossalmerode (DE)

( * ) Notice: Subject to any disclaimer, the term of this patent is extended or adjusted under 35 U.S.C. 154(b) by 0 days.

(21) Appl. No.: 09/365,666

(22) Filed: Aug. 2, 1999

(30) Foreign Application Priority Data

Aug. 4, 1998 (DE) .............................. 198 35 143

(51) Int. Cl.⁷ .................................................. C04B 35/18
(52) U.S. Cl. .............................................. 501/128
(58) Field of Search ...................... 501/128, 133

(56) References Cited

FOREIGN PATENT DOCUMENTS

| 0 558 939 A1 | 2/1993 | (EP) . |
|---|---|---|
| 0558939 | * 2/1993 | (EP) . |
| WO 96/09999 | * 4/1996 | (WO) . |

* cited by examiner

Primary Examiner—Paul Marcantoni
(74) Attorney, Agent, or Firm—Thomas, Kayden, Horstemeyer & Risley

(57) ABSTRACT

A large format fireclay refractory block for use in a tin bath includes a material including fine grains and large grains. The fine grains have a diameter of less than 0.075 mm and they include more than 65 percent by weight of $SiO_2$ and less than 35 percent by weight of $Al_2O_3$. The fine grains include an increased amount by weight of alkali acid and of silicid acid and a decreased amount by weight of $Al_2O_3$ for forming a glass phase in the fine grains. The large grains have a diameter of more than 1.500 mm and they include less than 65 percent by weight of $SiO_2$ and more than 35 percent by weight of $Al_2O_3$. The block includes a fist surface being made of the material and being adapted for contacting a tin bath. A method of producing such a large format fireclay refractory block includes the steps of preparing the fine grains and the large grains separately, preparing a material by mixing the fine grains and the large grains, forming a block of the material, drying the block, firing the block and grinding the block to its desired dimensions.

23 Claims, No Drawings

LARGE FORMAT FIRECLAY REFRACTORY BLOCK AND METHOD OF PRODUCING THE SAME

CROSS REFERENCE TO RELATED APPLICATIONS

This application claims the benefit of co-pending German patent application number 198 35 143.7 entitled "Großformatiger Schamottestein, insbesondere Zinnbadbodenstein, und Verfahren zu seiner Herstellung", filed on Aug. 4, 1998.

FIELD OF THE INVENTION

The invention generally relates to a large format fireclay refractory block for use in a tin bath. The invention also relates to a method of producing a large format fireclay refractory block. More particularly, the invention relates to a fireclay refractory block including a material including fine grains and large grains.

BACKGROUND OF THE INVENTION

Fireclay refractory blocks for use in a tin bath are known in the art. Such blocks have a rectangular cross section, and they include a first surface being adapted for contacting a tin bath, a second surface facing away from the tin bath and four side surfaces. All of these surfaces are grinded to the desired dimensions of the block after producing and firing the block.

A large format fireclay refractory block for use in a tin bath is known from the German Patent No. 42 06 734 C2 and from the corresponding U.S. Pat. No. 5,407,875. The material of the block includes 33 to 43 percent by weight of $Al_2O_3$ and 1 to 3 percent by weight of alkali oxide. The material has a resistance to pressure of 35 to 60 $N/mm^2$, a pressure elastic modulus of 3,000 to 10,000 $N/mm^2$, an open porosity of 19.7 to 25 percent by volume, a gas permeability of less than 3 nPm and a hydrogen diffusion of less than 1,471.5 Pa (about 147 mm $H_2O$). The blocks are placed and mounted in a steal construction being part of a glass production facility. The steal construction is coated by the blocks. Thus, a production tub is formed. The tub is filled with liquid tin. The melted glass is poured out on the surface of the tin bath. The glass expands on the surface of the tin bath, and it is drawn as a thin band having a substantial width over the surface of the tin bath. This is the known way of manufacturing flat glass according to the floating technique. The flat glass includes about 15 percent of $Na_2O$. $Na_2O$ diffuses into the melted metal in the contacting region between the glass and the liquid tin. The tin bath includes sodium and atomic oxygen in a solved manner. The solubility of sodium and of atomic oxygen in tin is a function of the temperature. In the process of producing flat glass, temperatures of about 1,200° C. to 600° C. occur. Due to thermically and mechanically induced floating of the liquid tin in the tin bath, parts of the tin including sodium contact the surface of the blocks facing the tin bath. Thus, an exchange of sodium between the tin and the blocks takes place. The atomic sodium penetrates into the refractory material, and it first reacts with the silica of the glass phase of the fireclay refractory blocks. Thereby, sodium oxide is generated. Due to the reduction of phases including silica, the reduced parts of the blocks show a gray or black color.

The known fireclay refractory blocks for use in the above described glass production facilities may have a length of approximately 1,000 mm, a width of approximately 600 mm and a height of approximately 300 mm. The blocks are made of a material including grains of different sizes of clay and alkali alumo silicate. After firing the block, mainly mullite, a small amount of cristobalite and a glass phase are present. The amount of the glass phase of such a fireclay refractory block or brick is determined by the amount of sodium oxide and potassium oxide. These oxides have a substantial influence on the chemical composition of the glass phase. The ratio of $Al_2O_3$ and $SiO_2$ in the block determines which alkali alumo silicate, either nephelinie or albite, are formed in layers of the block close to the surface of the block in case of an attack by metallic sodium. The thermical expansion factor of nepheline is approximately four times the expansion factor of mullite. Thus, an enlargement and a growing of the layers of the block adjacent to the surface of the block contacting the tin bath occurs. Due to the rectangular shape of the blocks, these layers contact each other. Consequently, tension occurs inside the production tub.

It is necessary not to have great gaps between the grinded side surfaces of the blocks to keep the blocks as close together as possible to prevent the liquid tin from passing through the gaps. Liquid tin passing through the gaps would result in a damage of the steal construction in which the fireclay refractory blocks are arranged. Since a penetration of the liquid tin into the gaps cannot be prevented in all cases, the steal construction is cooled on its outside to freeze tin penetrating through the gaps.

Due to the increase of the volume of the layers in the region of the surface of the block to contact the tin bath, chipping off particles occurs in the region of these layers. These layers are especially located in the edge portions of the surface of the block to contact the tin bath. Since the ceramic material of the fireclay refractory block has a lower relative density than tin, the chipped off material floats upwardly in the direction of the surface of the tin bath. This floating effect of parts of the blocks may cause substantial trouble in the production process of the flat glass.

Another fireclay refractory block is known from the German Patent No. 195 49 057 C1. The surface of the block to contact the tin bath includes a coating including alkali silicate. The coating includes a relative amount of $Al_2O_3$ which is decreased compared to the material of the block, and alkali acid and silicid acid being increased with respect to the material of the block. The coating is provided to form a separating layer on the surface of the block, the separating layer forming a glazing and acting as reactant for sodium from the tin bath. With this arrangement, the forming of feldspar or substitutes of feldspar is substantially reduced to prevent chipping off effects in the use of the block in a tin bath. The coating is arranged on the surface of the block contacting the tin bath, this means at least on its upper surface and possibly on portions of the side surfaces of the block. The coating serves to form a thin glazing due to heat. Alkalis are used as flux agents, especially in combination with an increased amount of $SiO_2$. In the simplest embodiment, the coating is applied by painting and a doctor blade, by spraying or the like. The glazing resulting from the coating preferably has a width of a fraction of a millimeter, but, at the same time, it is to be fixedly anchored in the pores of the surface. The forming of the glazing is possible due to a great amount of alkali acid and silicid acid in the thin layer of the coating. Thus, the glazing itself also has a small width being small enough to prevent chipping off effects and floating effects of pieces of the glazing in the tin bath. The coating and the glazing being formed therefrom act as reactants, and they form a separating layer for atomic sodium delaying reactions, so that the atomic sodium penetrates from the tin bath into the layer of the coating or of the glazing, but not into deeper regions of the material of the block. The effect of the separating layer is also based on the fact that open pores are filled by the coating, and thus, a mechanical separating effect is attained. At the same time, the coating is fixedly anchored in the pores of the surface of the block. Due to a limitation of the coating to a thin layer, layer dimensions are prevented, as they are typical of pieces chipping off and floating in the tin bath in the prior art. Nevertheless, the application of the coating makes an additional step necessary in the production of the block. Thus, the production costs for a block including a coating are increased with respect to a block not including a coating. Additionally, it is difficult to control the thickness of the glazing.

SUMMARY OF THE INVENTION

Briefly described, the present invention provides an improved fireclay refractory block for use in a tin bath. The block includes a material including fine grains of a diameter of less than 0.075 mm including more than 65 percent by weight of $SiO_2$ and less than 35 percent by weight of $Al_2O_3$. The fine grains include an increased amount by weight of alkali acid and of silicid acid and a decreased amount by weight of $Al_2O_3$ with respect to the prior alt for forming a glass phase in the fine grains. The material further includes large grains of a diameter of more than 1.500 mm including less than 65 percent by weight of $SiO_2$ and more than 35 percent by weight of $Al_2O_3$. The large grains (also including grains of middle sizes) serve to attain a reduced forming of a glass phase in the large grains. The block further includes a first surface being made of the novel material being adapted for contacting a tin bath.

The material may especially include fine grains in an amount of more than 50 percent by weight including approximately 65 to 95 percent by weight of $SiO_2$ and approximately 35 to 5 percent by weight of $Al_2O_3$. The material may especially include large grains including approximately 35 to 65 percent by weight of $SiO_2$ and approximately 65 to 35 percent by weight of $Al_2O_3$. It is understood that these figures are no absolute numbers since impurities in the material can never be absolutely prevented, and therefore they always have to be considered.

The invention is based on the idea to use at least two different fractions in the production of the refractory block. The at least two fractions are separately produced. One of the at two fractions includes fine grains, and the other fraction includes large grains. The terms "fine" and "large" are not to be understood as absolute or limiting references. Instead, they are used as relative references indicating that the majority of one of the fractions of the grains is smaller than the majority of the other fraction of the grains. The term "diameter" is not to be understood as indicating that the grains necessarily have a circular shape. Instead, it is a reference to the maximum extension of the grains. The at least two fractions react differently to the sodium diffusing into the fireclay refractory block.

The fine grains include a comparatively great amount of $SiO_2$ and a comparatively small amount of $Al_2O_3$. It is desired to form albite ($Na_2O.Al_2O_3.6.SiO_2$) to use the comparatively low expansion factor of albite ($7.3 \times 10^{-6} K^{-1}$). Due to relatively high temperatures during the use of the glass tub, a glass phase, i.e. a glazing, is built. The glazing does not only have an effect on the surface of the block, but also on regions inside the block. A forming of albite is positively influenced, and a forming of nepheline is prevented and delayed, respectively, in the fine grains. The fine grains surround the large grains, and with their glass phase they forms an albite cover covering the large grains. The albite cover delays the penetration of sodium into the large grains during operation of the glass facility. The albite cover also forms a micro separating layer. Since albite has a melting point of 1,118° C., the glass phase is attained in certain regions inside the block, and is not attained in other regions inside the block during operation of the glass facility. At the locations at which the albite is liquid, this does not have a negative effect. At the other locations, it has better properties than nepheline.

The large grains include a comparatively great amount of $Al_2O_3$ and a comparatively low amount of $SiO_2$. Due to the composition of the large grains, nepheline ($Na_2O.Al_2O_3.2.SiO_2$) is formed in the surface of the large grains. The building of nepheline results in an increase of the volume and in corresponding heat expansions. Due to the relatively great expansion factor ($17.4 \times 10^{-6} K^{-1}$), a building of nepheline is not desired, but it cannot be prevented during long terms of use of the block. Due to the albite micro separating layer surrounding the large grains, the penetration of sodium into the large grains is effectively delayed. Additionally, the large grains are secured by the fine grains, so that chipping off and floating of particles is prevented. Albite and nepheline are both present at the same time, the nepheline being formed under long term conditions. In this way, the expansion factors being relatively close to one another are used to prevent chipping off particles.

The material of the block may include the fine grains in an amount of more than 50 percent by volume, of 50 to 65 percent by volume, and especially of approximately 60 percent by volume. Such a percentage of fine grains in the material is comparatively great. Usually, a fireclay refractory block includes 30 to 35 percent by volume of fine grains. With this comparatively great amount of fine grains, more potential for the glass phase is provided, so that the glass phase may serve longer as micro separating layer for the sodium. Thus, an increase of the action time of the fireclay refractory block is attained. It is always important to the invention to use the amount of fine grains in combination with the amount of large grains. Thus, it is not possible not to use large grains at all.

The material of the block may include middle grains of a diameter of more than 0.075 mm and less than 1.500 mm in an amount of up to 15 percent by volume, and especially of 6 percent by volume. Although it is essential to the invention to chose an adequate ratio of the amounts of fine grains and large grains, it is also possible to additionally use middle grains. The middle grains may be formed by large grains of the fine grains and small grains of the large grains. It is not desired to use too many of the middle grains since the combination of the fine grains and the large grains is essential to the invention.

The material may include middle grains of a diameter more than 0.075 mm and less than 1.500 mm, the middle grains including 40 to 65 percent by volume of $SiO_2$ and 60 to 35 percent by volume of $Al_2O_3$. The middle grains serve as a buffer or as a transition region between the fine grains and the large grains.

The fine grains of the material may include at least two raw material components. One of the at least two raw material components may include clay including $SiO_2$, and one of the at least two raw material components may include alkali alumo silicate. It is also possible to combine other suitable raw materials.

The fine grains may further include amorphous $SiO_2$ in finely distributed form to attain a positive effect on the forming of a glass phase including a great amount of $SiO_2$.

The present invention also relates to a method of producing a large format fireclay refractory block. According to the method, the fine grains of a diameter of less than 0.075 mm including more than 65 percent by weight of $SiO_2$ and less than 35 percent by weight of $Al_2O_3$ are prepared. Large grains of a diameter of more than 1.500 mm including less than 65 percent by weight of $SiO_2$ and more than 35 percent by weight of $Al_2O_3$ are prepared. Then, a material is prepared by mixing the fine grains with the large grains. The fine grains and the large grains are preferably mixed to form a homogenous material. A block is formed of the material, the block is dried, fired and finally grinded to its desired dimensions to fit in a steel construction of a tin bath of a glass production facility.

The material may be prepared by mixing clay having a powder density of more than 500 g/l, feldspar having a powder density of more than 700 g/l and micro silica having a powder density of more than 300 g/l.

It is therefore an object of the present invention to provide an improved large format fireclay refractory block.

Another object of the present invention is to provide a large format fireclay refractory block having reduced chipping off effects and floating effects of pieces in the tin bath.

Another object of the present invention is to provide a large format fireclay refractory block having an increased action time.

Another object of the present invention is to provide a large format fireclay refractory block having reduced production costs.

Another object of the present invention is to provide a method of producing an improved fireclay refractory block.

Another object of the present invention is to provide a method of producing a fireclay refractory block having reduced chipping off effects and floating effects of pieces in the tin bath.

Another object of the present invention is to provide a method of producing a fireclay refractory block at low costs.

Other objects, features and advantages of the present invention will become apparent to one with skill in the art upon examination of the following table and the detailed description. It is intended that all such additional objects, features and advantages be included herein within the scope of the present invention, as defined by the claims.

BRIEF DESCRIPTION OF THE TABLE

The invention can be better understood with reference to the following table. The figures in the table are not necessarily to scale, emphasis instead being placed upon clearly illustrating the principles of the present invention.

Table 1 illustrates three exemplary compositions of the material for a large format fireclay refractory block.

DETAILED DESCRIPTION

Referring now in greater detail to the table table 1 illustrates a first exemplary embodiment 1 (column 1 of table 1) of a material of a large format fireclay refractory block. The material includes fine grains including 21 percent by volume of $Al_2O_3$. The amount of $Al_2O_3$ in the fine grains is relatively low, and therefore, the amount of $SiO_2$ of 78 percent by volume is relatively great. Only 5 percent by volume of impurities are included in the material. This figure results from the sum of the fine grains and the large grains (the material has 100 percent by volume, the sum of the fine grains and the large grains is 95 percent by volume of the material, consequently, impurities have a percentage of 5 percent by volume of the material).

The large grains include 36 percent by volume of $Al_2O_3$. This percentage is relatively great. The ratio of fine grains to large grains is 61:34. The block being made of this material has an excellent cold crush strength. The relative amount of $Al_2O_3$ in the entire block of 25 percent by volume is relatively low. Thus, chipping off effects are also relatively low.

The exemplary composition of embodiment 2 (column 2) provides fine grains having an even greater relative amount of 32 percent by volume of $Al_2O_3$ in the fine grains. The relative amount of $Al_2O_3$ in the large grains is relatively great, so that the entire block (or the material of the block) includes approximately 35 percent by volume of $Al_2O_3$.

In example 3, the relative amount of fine grains and of large grains in the material is almost even. A relative amount of $Al_2O_3$ of 40 percent by volume in the block results from this. The relative amount of $SiO_2$ in a block being formed from this material is rather low. This block also provides an advantageously long action time.

TABLE 1

|  | 1 | 2 | 3 |
|---|---|---|---|
| fine grains 78% $SiO_2$ 21% $Al_2O_3$ | 61 | — | — |
| large grains 62% $SiO_2$ 36% $Al_2O_3$ | 34 | — | — |
| fine grains 76% $SiO_2$ 23% $Al_2O_3$ | — | 61 | — |
| large grains 39% $SiO_2$ 60% $Al_2O_3$ | — | 35 | — |
| fine grains 75% $SiO_2$ 24% $Al_2O_3$ | — | — | 52 |
| large grains 39% $SiO_2$ 61% $Al_2O_3$ | — | — | 45 |
| raw unit weight (g/cm$^3$) | 2,05 | 2,10 | 2,12 |
| open porosity (Vol %) | 21 | 22 | 24 |
| cold crush strength (MPa) | 45 | 35 | 40 |
| gas permeability (nPm) | 1,5 | 2,5 | 2,0 |
| Youngs modulus (CPa) | 0,50 | 0,40 | 0,45 |
| $Al_2O_3$ | 25,2 | 35,3 | 39,6 |
| $SiO_2$ | 68,5 | 59,7 | 55,9 |
| $TiO_2$ | 2,0 | 2,1 | 2,1 |
| $Fe_2O_3$ | 1,7 | 0,3 | 0,3 |
| $Na_2O$ | 0,5 | 0,5 | 0,5 |
| $K_2O$ | 0,9 | 0,4 | 0,3 |
| CaO | 0,3 | 0,2 | 0,2 |
| MgO | 0,5 | 0,2 | 0,2 |

We claim:

1. A large format fireclay refractory block for use in a tin bath, said block comprising: a material including
    fine grains of a diameter of less than 0.075 mm including more than 65 percent by weight of $SiO_2$ and less than 35 percent by weight of $Al_2O_3$, said fine grains including an increased amount by weight of alkali acid and of silicid acid and a decreased amount by weight of $Al_2O_3$ for forming a glass phase in said fine grains;
    large grains of a diameter of more than 1.500 mm including less than 65 percent by weight of $SiO_2$ and more than 35 percent by weight of $Al_2O_3$; and a fist surface being made of said material and being adapted for contacting a tin bath.

2. The large format fireclay refractory block of claim 1, wherein said material includes said fine grains in an amount of more than 50 percent by weight.

3. The large format fireclay refractory block of claim 1, wherein said material includes said fine grains in an amount of 50 to 65 percent by weight.

4. The large format fireclay refractory block of claim 1, wherein said material includes said fine grains in an amount of approximately 60 percent by weight.

5. The large format fireclay refractory block of claim 1, wherein said fine grains include 65 to 95 percent by weight of $SiO_2$ and 35 to 5 percent by weight of $Al_2O_3$, and said large grains include 65 to 35 percent by weight of $SiO_2$ and 35 to 65 percent by weight of $Al_2O_3$.

6. The large format fireclay refractory block of claim 2, wherein said fine grains include 65 to 95 percent by weight of $SiO_2$ and 35 to 5 percent by weight of $Al_2O_3$, and said large grains include 65 to 35 percent by weight of $SiO_2$ and 35 to 65 percent by weight of $Al_2O_3$.

7. The large format fireclay refractory block of claim 3, wherein said fine grains include 65 to 95 percent by weight of $SiO_2$ and 35 to 5 percent by weight of $Al_2O_3$, and said large grains include 65 to 35 percent by weight of $SiO_2$ and 35 to 65 percent by weight of $Al_2O_3$.

8. The large format fireclay refractory block of claim 4, wherein said fine grains include 65 to 95 percent by weight of $SiO_2$ and 35 to 5 percent by weight of $Al_2O_3$, and said large grains include 65 to 35 percent by weight of $SiO_2$ and 35 to 65 percent by weight of $Al_2O_3$.

9. The large format fireclay refractory block of claim 1, wherein said material further includes middle grains of a diameter of more than 0.065 mm and less than 1.500 mm in an amount of less than 15 percent by weight.

10. The large format fireclay refractory block of claim 2, wherein said material further includes middle grains of a diameter of more than 0.065 mm and less than 1.500 mm in an amount of less than 15 percent by weight.

11. The large format fireclay refractory block of claim 3, wherein said material further includes middle grains of a diameter of more than 0.065 mm and less than 1.500 mm in an amount of less than 15 percent by weight.

12. The large format fireclay refractory block of claim 4, wherein said material further includes middle grains of a diameter of more than 0.065 mm and less than 1.500 mm in an amount of less than 15 percent by weight.

13. The large format fireclay refractory block of claim 1, wherein said material further includes middle grains of a diameter of more than 0.065 mm and less than 1.500 mm in an amount of approximately 6 percent by weight.

14. The large format fireclay refractory block of claim 2, wherein said material further includes middle grains of a diameter of more than 0.065 mm and less than 1.500 mm in an amount of approximately 6 percent by weight.

15. The large format fireclay refractory block of claim 3, wherein said material further includes middle grains of a diameter of more than 0.065 mm and less than 1.500 mm in an amount of approximately 6 percent by weight.

16. The large format fireclay refractory block of claim 4, wherein said material further includes middle grains of a diameter of more than 0.065 mm and less than 1.500 mm in an amount of approximately 6 percent by weight.

17. The large format fireclay refractory block of claim 9, wherein said middle grains include 40 to 65 percent by weight of $SiO_2$ and 60 to 35 percent by weight of $Al_2O_3$.

18. The large format fireclay refractory block of claim 10, wherein said middle grains include 40 to 65 percent by weight of $SiO_2$ and 60 to 35 percent by weight of $Al_2O_3$.

19. The large format fireclay refractory block of claim 11, wherein said middle grains include 40 to 65 percent by weight of $SiO_2$ and 60 to 35 percent by weight of $Al_2O_3$.

20. The large format fireclay refractory block of claim 12, wherein said middle grains include 40 to 65 percent by weight of $SiO_2$ and 60 to 35 percent by weight of $Al_2O_3$.

21. The large format fireclay refractory block of claim 1, wherein said fine grains include at least two raw material components.

22. The large format fireclay refractory block of claim 21, wherein one of said at least two raw material components includes clay including $SiO_2$, and one of said at least two raw material components includes alkali alumo silicate.

23. The large format fireclay refractory block of claim 22, wherein said fine grains further include amorphous $SiO_2$ in finely distributed form.

* * * * *